(12) United States Patent
Bärnström et al.

(10) Patent No.: US 9,534,688 B2
(45) Date of Patent: Jan. 3, 2017

(54) HYDRAULIC CYLINDER ASSEMBLY, A CYLINDER FOR A PISTON ROD-CYLINDER HYDRAULIC ASSEMBLY AND USE OF A HYDRAULIC CYLINDER ASSEMBLY

(71) Applicant: BT Products AB, Mjöby (SE)

(72) Inventors: Joakim Bärnström, Ljungsbro (SE); Johan Vestman, Linköping (SE)

(73) Assignee: TOYOTA MATERIAL HANDLING MANUFACTURING SWEDEN AB, Mjölby (SE)

( * ) Notice: Subject to any disclaimer, the term of this patent is extended or adjusted under 35 U.S.C. 154(b) by 310 days.

(21) Appl. No.: 14/267,027

(22) Filed: May 1, 2014

(65) Prior Publication Data

US 2014/0326132 A1    Nov. 6, 2014

(30) Foreign Application Priority Data

May 3, 2013    (EP) .................................... 13166378

(51) Int. Cl.
  *F16J 1/12*    (2006.01)
  *F15B 15/14*   (2006.01)

(52) U.S. Cl.
  CPC .............. *F16J 1/12* (2013.01); *F15B 15/1433* (2013.01)

(58) Field of Classification Search
  CPC .. F15B 15/1461; F15B 15/1471; F04B 53/164
  USPC ....................................................... 92/165 R
  See application file for complete search history.

(56) References Cited

U.S. PATENT DOCUMENTS

| 3,333,513 | A |   | 8/1967  | Wettstein |
| 6,012,847 | A |   | 1/2000  | Kahle |
| 7,607,383 | B2 | * | 10/2009 | Nagel ................. F15B 15/1433 92/165 R |
| 2013/0098241 | A1 |  | 4/2013 | Van der Heide |

FOREIGN PATENT DOCUMENTS

| EP | 2584203 A1 |   | 4/2013 |
| JP | 58084240 A | * | 5/1983 |
| JP | S5884240 A |   | 5/1983 |

OTHER PUBLICATIONS

European Search Report for EP Appl'n No. 13166378.3, Sep. 25, 2013.

* cited by examiner

*Primary Examiner* — Thomas E Lazo
(74) *Attorney, Agent, or Firm* — Quarles & Brady LLP

(57) ABSTRACT

A hydraulic cylinder assembly includes a cylinder and a piston rod. The cylinder has an opening and upper and lower inner walls formed by a bore. An end of the piston rod is received in the bore through the opening and travels reciprocally through the opening in response to volume change of a hydraulic fluid in the cylinder. The cylinder has a first section adjacent the opening provided with a narrow passage of the piston rod close to the cylinder upper inner wall. The cylinder has further a second section spaced apart from the opening and provided with a clearance between the piston rod and the lower inner wall forming a chamber for the hydraulic fluid. The inner upper wall at the first section is provided with circumferential camberings.

6 Claims, 6 Drawing Sheets

… (1)

HYDRAULIC CYLINDER ASSEMBLY, A CYLINDER FOR A PISTON ROD-CYLINDER HYDRAULIC ASSEMBLY AND USE OF A HYDRAULIC CYLINDER ASSEMBLY

CROSS-REFERENCE TO RELATED APPLICATIONS

This application claims priority to European Patent Application No. 13166378.3 filed on May 3, 2013, which is fully incorporated herein by reference.

STATEMENT REGARDING FEDERALLY SPONSORED RESEARCH OR DEVELOPMENT

Not applicable.

FIELD OF THE INVENTION

The present invention relates to a hydraulic cylinder assembly comprising a cylinder and a piston rod. The present invention also relates to a cylinder for a piston rod-cylinder hydraulic assembly, and a use of a hydraulic cylinder assembly.

BACKGROUND OF THE INVENTION

In e.g. industrial trucks there are mechanical constructions that interact with hydraulic cylinder assemblies, where the interacting motion of the mechanics is not accurate. There is always a force for returning the piston rod back into the cylinder and the force can be the weight from the load that is intended to be lifted by the piston rod of the hydraulic cylinder. The forces from the mechanics of the industrial truck are sometimes not applied to the piston rod in the centre axis of the cylinder. This results in an obliqueness of the piston rod relative the cylinder. An out-of-line force causes a moment and an inclination of the piston rod that result in side forces and a high contact pressure between the piston rod and the cylinder. Although there have been attempts to eliminate the effects of out-of-line forces in a hydraulic cylinder assembly by providing a cylinder pipe that is accurately turned out, such that the piston rod travels in the cylinder with a minimal gap to the inner wall of the cylinder, there will still be a play between the rod and the cylinder. As a result, out-of-line force causes an inclination of the piston rod that result in high contact pressure between the piston rod and the cylinder, which may give rise to scratching of the piston rod by the cylinder inner wall. There are a number of further drawbacks with such a machined cylinder pipe, relating to the design of the system, such as the amount of lubricating film of hydraulic oil in the contact area, surface contact forces, undefined forces and point forces, as well as pressure build-up.

In recent years, the problems mentioned above have been solved by providing guide rings for rods and piston guides in hydraulic cylinders. U.S. Pat. No. 6,012,847 discloses guide-ring arrangements for hydraulic cylinder. However, guide rings require some space in the cylinder. The guide rings are expensive and subjected to wear.

SUMMARY OF THE INVENTION

The objective of the present invention is to provide a hydraulic cylinder that eliminates the disadvantages associated with prior art. A further objective is to achieve an improved hydraulic cylinder assembly and components thereof that are uncomplicated to produce, assemble and design, compared to prior art. Other objects are to provide a hydraulic cylinder assembly and components thereof without the use of guide rings and that are less expensive. Yet a further object is to decrease the damages and wear due to out-of-line forces when the piston rod is inclined relative the cylinder.

The above objectives are solved by the present invention which relates to a hydraulic cylinder assembly comprising a cylinder and a piston rod. The piston rod has one end disposed in the cylinder. The cylinder has an opening and inner walls formed by a bore. The end of the piston rod travels reciprocally in the bore through the opening as response to volume change of a hydraulic fluid in the cylinder. The cylinder has a first section adjacent the opening provided with a narrow passage of the piston rod close to the cylinder upper inner wall. The cylinder has further a second section spaced apart from the opening. The second section is provided with a clearance between the piston rod and the lower inner wall forming a chamber for the hydraulic fluid. The inner upper wall at the first section is provided with circumferential camberings.

In accordance with the solution of the present invention, a hydraulic cylinder assembly is achieved that results in less wear, has a more compact design and is inexpensive to produce. Due to the cambering of the cylinder, there is no longer necessary to use guide rings. Other advantages are that the solution according to the present invention provides for insignificant play and less friction between the piston rod and the cylinder.

According to an embodiment of the present invention, a first cambering is formed at a first portion and a second cambering is formed at a second portion at the upper inner wall of the cylinder, where the first portion and the second portion being the most closest parts of the cylinder to a central axis of the cylinder and the piston rod. Further, the piston rod can be sealed to the cylinder by a seal at the opening in the uppermost end of the cylinder, through which the piston rod travels, wherein the distance between the camberings extend with a length in the range from about 5% up to about 50% of the piston stroke between the first portion, next to the seal in opening of the cylinder, and the second portion positioned next to the chamber formed in the second section.

The present invention also relates to a cylinder for a piston rod-cylinder hydraulic assembly. The cylinder has an opening and inner walls formed by a bore, the cylinder has a first section adjacent the opening. The first section being close to the cylinder upper inner wall. The cylinder has further a second section spaced apart from the opening. The inner upper wall at the first section is provided with circumferential camberings. According to an embodiment, a first cambering can be formed at a first portion and a second cambering is formed at a second portion at the upper inner wall of the cylinder, where the first portion and the second portion being the most closest parts of the cylinder to a central axis of the cylinder. Further, the cylinder comprises at least one seal at the opening in the uppermost end of the cylinder. The distance between the camberings may extend with a length in the range from about 5% up to about 50% of the piston stroke between the first portion, next to the seal in opening of the cylinder, and the second portion positioned next to the chamber formed in the second section.

The present invention also relates to a use of the hydraulic cylinder assembly, or the cylinder for a piston rod-cylinder hydraulic assembly, according to the present invention and as mentioned above, in an industrial truck.

Other objectives, embodiments and advantages of the present invention are described in closer detail in the description and in the subsequent patent claims.

BRIEF DESCRIPTION OF THE DRAWINGS

The invention will hereinafter be described with reference to embodiments of the present invention and the accompanying drawings, in which.

DETAILED DESCRIPTION OF EXAMPLE EMBODIMENTS

Figure 1:
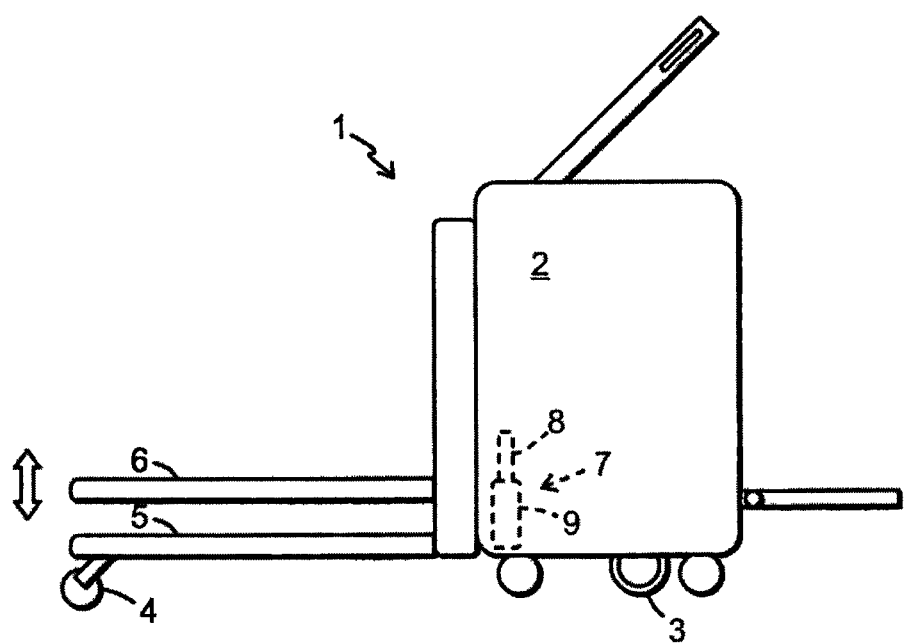
FIG. 1 is a schematic drawing of an industrial truck according to a first preferred embodiment of the invention.

FIG. 1 illustrates schematically an industrial truck 1 according to a first preferred embodiment of the invention. The truck illustrated in FIG. 1 is a so called tiller arm truck. However, it is within the scope of protection that the present invention can be used in any other kind of industrial trucks, such as a lift truck, having load engaging means that can be raised or lowered. This truck type, also known as stacker or order pick truck, is generally known in the art and its features will therefore only be briefly described. The truck comprises a housing 2 in which the motor, the hydraulic system and the control system of the truck are located (these parts are not shown in FIG. 1). The truck comprises a drive wheel 3 which is propelled by the motor, forward support wheels 4 that are arranged on support arms 5 and a load engaging means 6 that can be raised and lowered by a hydraulic cylinder 7 comprising a piston rod 8 and a cylinder 9. To be precise, forces F from the load engaging means 6 are applied to the top of the piston rod 8 of the hydraulic cylinder 7, during travelling of the piston rod 8 in the cylinder 9.

Figure 2A:
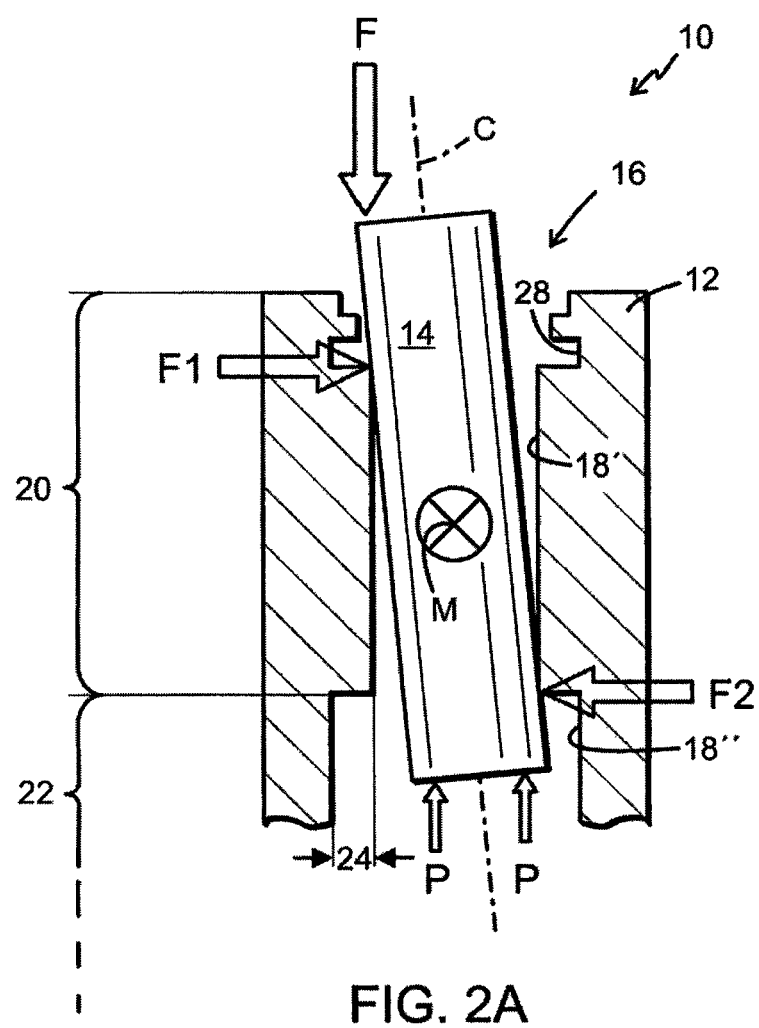
FIG. 2A schematically shows a hydraulic cylinder arrangement according to prior art in a partial view.
Figure 2B:
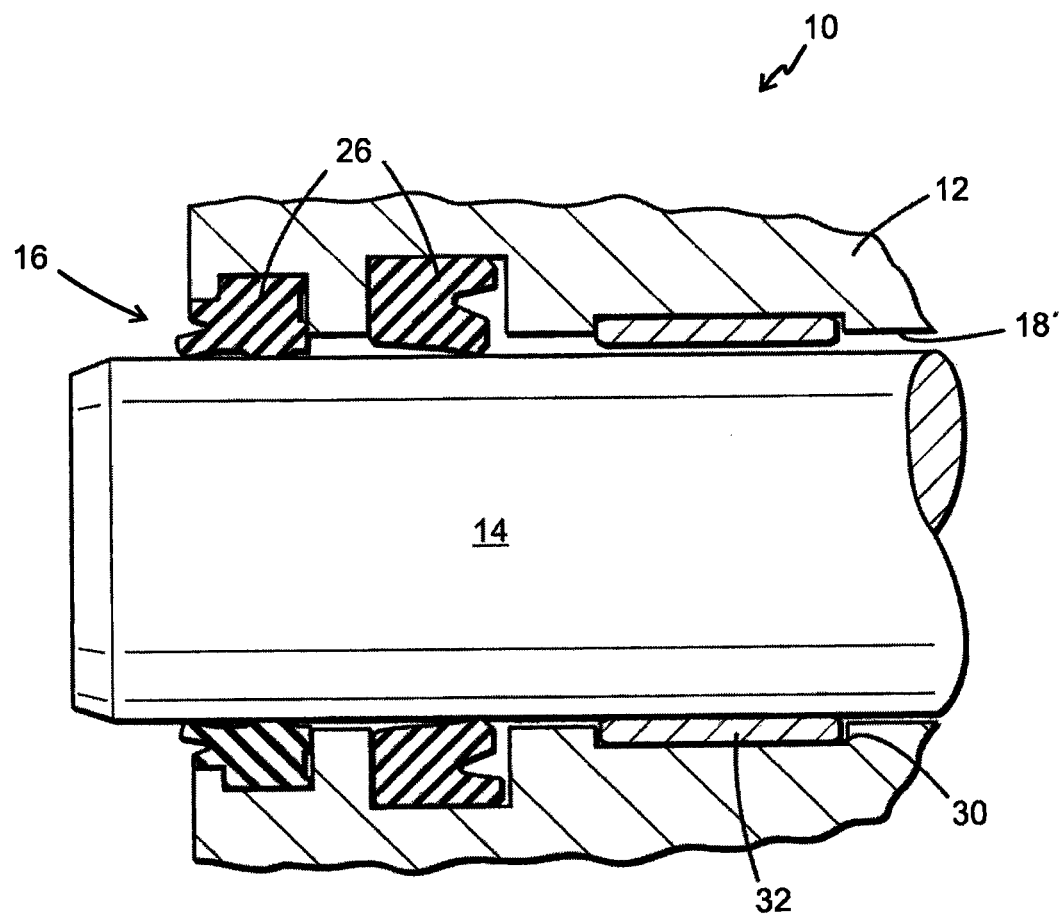
FIG. 2B illustrates a hydraulic cylinder arrangement with guide rings according to prior art in a partial view.

The illustrated designs in FIGS. 2A-B shows hydraulic cylinder arrangements 10 according to prior art. In FIG. 2A is shown a hydraulic cylinder arrangement 10 comprising a cylinder 12 and a piston rod 14. The cylinder 12 has an opening 16 and inner walls 18', 18" formed by a bore, in which bore the end of the piston rod 14 travels reciprocally through the opening 16 as response to volume change of a hydraulic fluid in the cylinder 12. The cylinder 12 has a first section 20 adjacent the opening 16 provided with a narrow passage of the piston rod close to the cylinder upper inner wall 18'. The first section 20, with an inlet section of the cylinder, can also be called rod gland. The cylinder 12 has further a second section 22 spaced apart from the opening 16. The second section 22 is provided with a clearance 24 between the piston rod 14 and the lower inner wall 18" forming a chamber for the hydraulic fluid. The piston rod 14 is sealed to the cylinder by one or more seals 26 (see FIG. 2B below) arranged in a respective recess 28 at the opening in the uppermost end of the cylinder 12.

In the hydraulic cylinder arrangement in FIG. 2A is shown that forces F from mechanics, in for instance from load engaging means in an industrial truck as described above with reference to FIG. 1, that are applied to the top of the piston rod 14. As shown, the forces F are not applied to the centre of the piston rod 14, but outside the centre axis C of the cylinder 12. In such case, the force F result in a force P to the underside of the piston rod. This result in obliqueness of the piston rod 14 relative the cylinder 12, by rotation around the centre of momentum M, and side forces F1 and F2 arises from contact between mating surfaces of the piston and cylinder. The points of contact in these prior art hydraulic cylinder arrangements are rather defined spots, delimited to a sharp edge or rim. Hence, the out-of-line force F causes a moment M and an inclination of the piston rod 14 that result in a high contact pressure between the piston rod 14 and the cylinder 12. Consequently, the piston rod 14 and the cylinder 12 will be subjected to enhanced friction and wear.

In the previously known hydraulic cylinder arrangement 10 illustrated in FIG. 2B, the cylinder 12 is provided with recesses 30 for guide rings 32 positioned at the inside 18' of the cylinder 12 to solve the problems mentioned above. These guide rings 32 compensate for side forces and deflections occurring in hydraulic cylinders, and avoids damages to the piston rod 14 from the cylinder 12. However, guide rings 32 require some space in the cylinder 12. The guide rings 32 are inter alia also expensive and subjected to wear, and have to be replaced when worn out.

Figure 3:
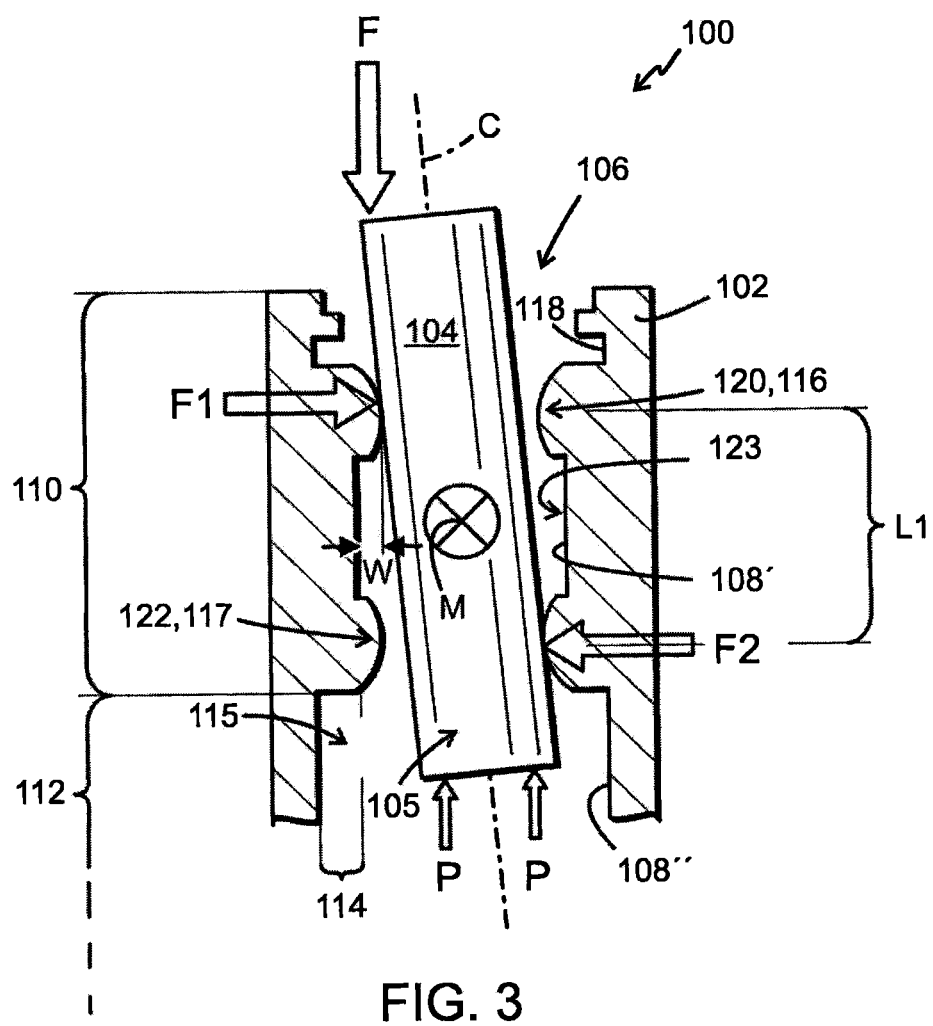
FIG. 3 schematically shows in a partial view, a cross-sectional view of a hydraulic cylinder assembly in accordance with an embodiment of the present invention.

To solve the above mentioned problems, the embodiment in the FIG. 3 shows the principle of the present invention. A piston rod hydraulic cylinder 100 assembly is illustrated comprising a cylinder 102 and a piston rod 104 that has one end 105 disposed in the cylinder 102. Hence, the piston rod works without any piston. The cylinder 102 has an opening 106 and inner walls 108', 108" formed by a bore, in which bore the end 105 of the piston rod 104 travels reciprocally through the opening 106 as response to volume change of a hydraulic fluid in the cylinder 102. The cylinder 102 has a first section 110, also called rod gland, adjacent the opening 106 provided with a narrow passage of the piston rod close to the cylinder upper inner wall 108'. The cylinder 102 has further a second section 112 spaced apart from the opening 106. The second section 112 provides a clearance 114 between the piston rod 104 and the lower inner wall 108", forming a chamber 115 for the hydraulic fluid. The clearance 114 is essentially of constant width along the whole second section 112. In accordance with the present invention, the inner upper wall 108' at the first section 110 is provided with circumferential camberings 116, 117. The piston rod 104 can also be sealed to the cylinder 102 by one or more seals (not shown) arranged in a respective recess 118 at the opening in the uppermost end of the cylinder 102.

Preferably, a first cambering 116 is formed at a first portion 120 and a second cambering 117 is formed at a second portion 122, at the surface of the upper inner wall 108' of the cylinder 102. The first portion 120 and the second portion 122 being the closest parts, to the central axis C of the cylinder and the piston rod 104 that travels in the cylinder. The piston rod 104 is sealed to the cylinder by a seal (not shown) in the recess 118. The first cambering 116 at the first portion 120 is next to the seal recess 118 in the opening 106 of the cylinder 102. The second cambering 117 at the second portion 122 is positioned next to the chamber formed in the second section 112. A cavity 123 is formed between the cambering 116, 117. Suitably, the distance between the camberings 116, 117 has preferably a length L1. Suitably the length L1, between the camberings 116, 117, parallel to the central axis C of the cylinder, is in the range from about 5% up to about 50% of the piston stroke. Most preferably, in accordance to the present invention, the number of camberings formed in the first section 110, also called rod gland, are two.

In FIG. 3 is also shown forces F from some mechanics, for instance from mechanics in an industrial truck, that are applied to the upper part of the piston rod 104 at a distance from the centre axis C of the cylinder 102. The force F result in a force P to the underside of the piston rod in the chamber 115. As a consequence, the piston rod 104 take an inclined position relative the cylinder 102, as seen in FIG. 3, by rotation around the centre of momentum M, and side forces F1 and F2 arises. The out-of-line force F causes a moment M and an inclination of the piston rod 104 that result in a high contact pressure between the piston rod 104 and the cylinder 102. Thanks to the circumferential camberings 116, 117 according to the present invention, the contact pressures as a result of the side forces, acting towards the first portion 120 and the second portion 122, can be permitted due to the fact that the surface pressures at the points of contact are decreased substantially compared to a cylinder without camberings. Consequently, damages and wear to the piston rod 104 from the cylinder 102 can be avoided. Moreover, friction of the piston rod 104 and the cylinder 102 can be eliminated to a high degree.

Figure 4A:
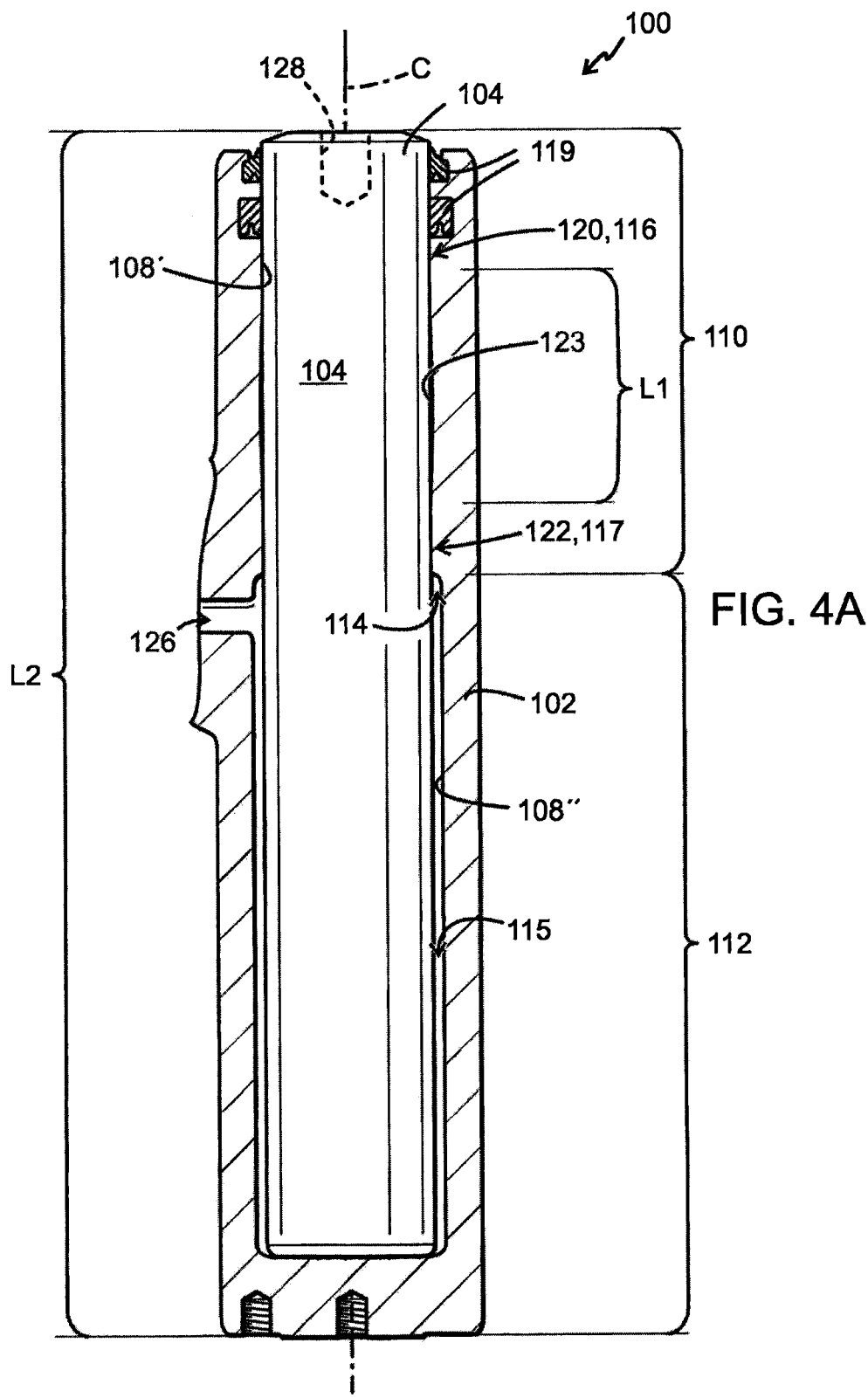
FIG. 4A shows a cross-sectional view of a hydraulic cylinder assembly in accordance with another embodiment of the present invention.
Figure 4B:
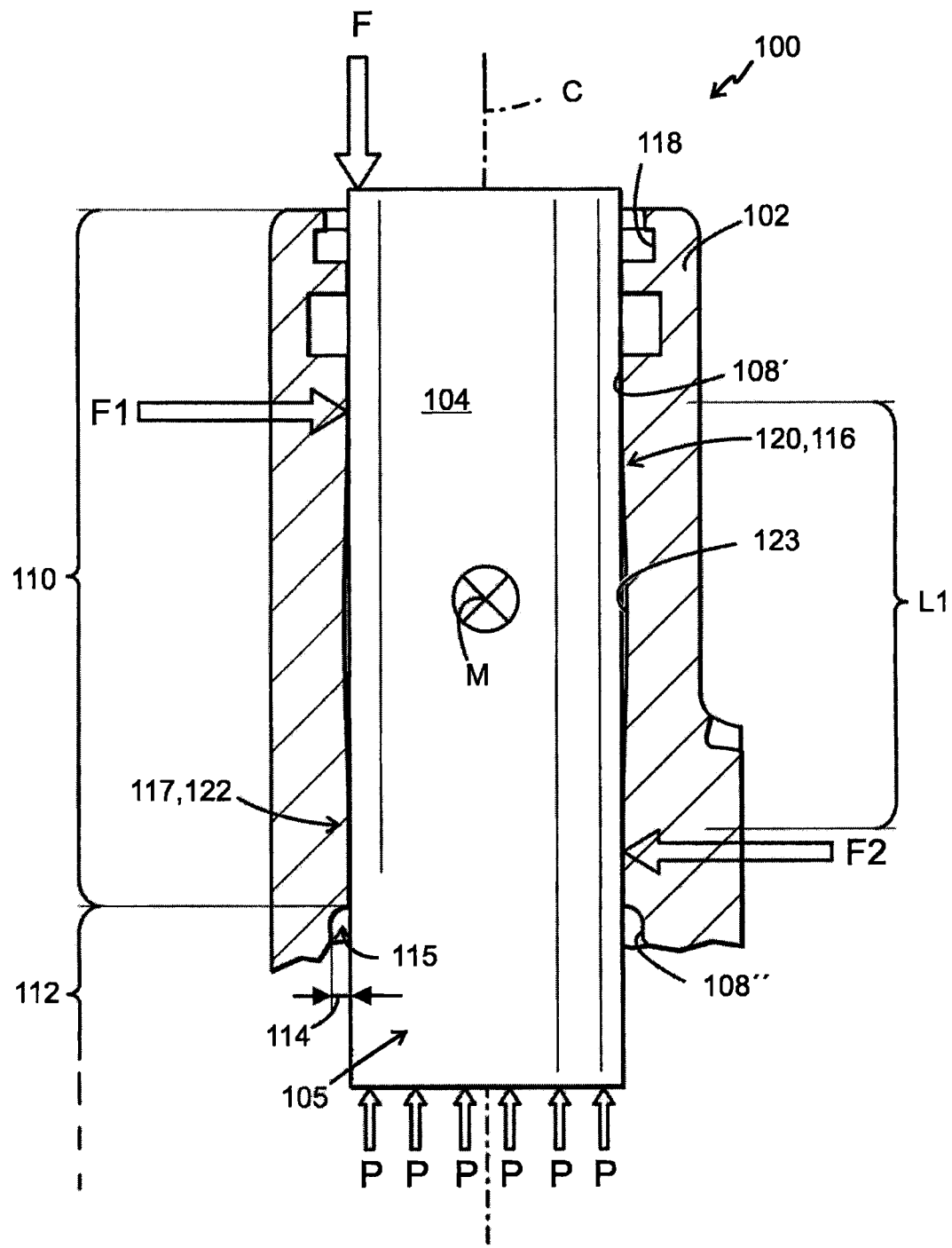
FIG. 4B shows in a partial view, an enlarged schematically illustration and cross-sectional view of the upper part of the hydraulic cylinder assembly in FIG. 4A.

According to the embodiment described and shown with reference to FIGS. 4A-B, the same reference numbers as in the embodiment of FIG. 3 have been used for the similar features. FIGS. 4A and 4B shows the same solution as FIG. 3, with the distinction that the features of the invention in the embodiment as illustrated in FIG. 3 are exaggeratedly illustrated.

FIG. 4A shows the whole hydraulic cylinder 100 assembly, having a total length L2 when the piston rod 104 is fully inserted in the cylinder 102. As evident, the hydraulic cylinder 100 assembly is of the kind that has a piston rod that is lacking a traditional piston head. The piston rod in itself works as the piston. The second section 112 provides the clearance 114 between the piston rod 104 and the lower inner wall 108", forming the chamber 115 for the hydraulic fluid. As evident from FIG. 4A, the clearance 114 has essentially a constant width along the whole length of the second section 112. In the cylinder 102 there is a connection 126 for input or output of hydraulic fluid to the chamber. The uppermost end of the piston rod 104 includes a cavity 128 intended for fastening of attachment means to be connected against a mechanical construction in an industrial truck for instance, for interaction with the hydraulic cylinder assembly for reciprocating motion.

The piston rod 104 is sealed to the cylinder 102 by one or more seals 119 arranged in a respective recess 118 at the opening in the uppermost end of the cylinder 102. In the embodiment described and shown with reference to FIGS. 4A-B, as well as in the embodiment of FIG. 3, the camberings 116, 117 are integrally formed with the cylinder wall, in the hydraulic cylinder assembly according to the present invention.

The concave camberings 116, 117 of the hydraulic cylinder assembly according to the embodiment in FIGS. 4A-B, has a radius of curvature R that is chosen depending on the force F, the elastic modulus in the material, the contact length between piston rod and cylinder, and the desired contact pressure to be reached.

Only for illustrating purpose with reference to FIG. 4B and not in any way limiting the scope of invention as defined by the claims, we have the following example for calculating the contact pressure with a predetermined radius of curvature of 260 mm for the camberings 116, 117 and a force F causing a momentum M that is taken up by the side forces F1 and F2. Further, a contact length of half the circumference of a 35 mm piston rod was assumed. With reference to FIG. 4B, each of the side forces F1 and F2 arises 23 mm from the centre of momentum M, and the force F is applied 12 mm from the centre axis C. If F=24000 N and F1=F2, the momentum is 288 Nm (24000*0.012), that is F1=6260 N (288/0.023*2). When assuming that the elastic modulus E=210 GPa and the contact length L=54 mm and that the radius of curvature for the concave camberings 116, 117 is R=260 mm, the maximal contact pressure will be:

$$\sigma = 0.418 \sqrt{\frac{6260 * 210000000000}{0.054 * 0.260}} = 127,9 \, MPa$$

In absence of the second cambering 117 according to the present invention, the contact pressure, or surface pressure, at the side force F2, would have been undefined and affected as a point load further down closer to the chamber 115 in FIG. 4A-B, as is shown by force F2 in FIG. 2A above. As large radius of curvature as possible in of the cambering 117 of the cylinder, above the chamber 115 for hydraulic fluid, is desirable to provide an improved and defined contact or surface pressure F2. The same applies to the first, cambering 116 closest to the opening of the cylinder. In absence of the cambering 116, the force F1 would have been undefined and affected as a point load further up closer to the opening. Further, according to the present invention, since contact forces can be defined for the system cylinder and piston rod, maximal forces and moment can be calculated. As a result, the machined contact surface in the cylinder pipe can be formed such that the surface pressures can be decreased as far as possible at the points of contact in the system cylinder and piston rod. By forming the mating surface of the cylinder that is close to the piston rod with a cambering, the surface forces can be defined and calculated. The result is a more compact and inexpensive cylinder without the need for any guide rings in the cylinder. There will be less wear, friction and considerably less play.

The invention claimed is:

1. A hydraulic cylinder assembly comprising:
a cylinder, the cylinder has an opening and upper and lower inner walls formed by a bore;
a piston rod having one end disposed in the bore through the cylinder opening, the piston rod travels reciprocally through the opening in response to a volume change of hydraulic fluid in the cylinder, the cylinder has a first section adjacent the opening provided with a narrow passage of the piston rod close to the cylinder upper inner wall, the cylinder has further a second section spaced apart from the opening, the second section is provided with a clearance between the piston rod and the lower inner wall forming a chamber for the hydraulic fluid; and
circumferential camberings integrally formed with said cylinder upper wall and extending inwardly from said cylinder upper wall.

2. The hydraulic cylinder assembly according to claim 1, wherein said circumferential camberings include a first cambering and a second cambering, said first cambering is formed at a first portion and said second cambering is formed at a second portion at the upper inner wall of the cylinder, where the first portion and the second portion being the most closest parts of the cylinder to a central axis of the cylinder and the piston rod.

3. The hydraulic cylinder assembly according to claim 2, where the piston rod is sealed to the cylinder by a seal adjacent said first cambering, through which the piston rod travels, wherein the distance between the camberings extend with a length in the range from about 5% up to about 50% of the piston stroke between the first portion, next to the seal in opening of the cylinder, and the second portion positioned next to the chamber formed in the second section.

4. A cylinder for a piston rod-cylinder hydraulic assembly, the cylinder comprising:
   a body including an opening and inner walls formed by a bore, the cylinder has a first section adjacent the opening, the first section being close to a cylinder upper inner wall forming part of the inner walls, the cylinder has further a second section spaced apart from the opening; and
   circumferential camberings integrally formed with said cylinder upper inner wall at the first section and extending radially inwardly from said cylinder upper inner wall.

5. The cylinder according to claim 4, wherein a first cambering of the circumferential camberings is formed at a first portion and a second cambering of the circumferential camberings is formed at a second portion at the upper inner wall of the cylinder, where the first portion and the second portion being the most closest parts of the cylinder to a central axis of the cylinder.

6. The cylinder according to claim 5, where the cylinder includes at least one seal adjacent said first cambering, wherein the distance between the first and second camberings extend with a length in a range from about 5% up to about 50% of the piston stroke between the first portion, next to the seal in the opening of the cylinder, and the second portion positioned next to a chamber formed in the second section.

* * * * *